United States Patent
Coulas et al.

(10) Patent No.: US 8,879,565 B2
(45) Date of Patent: Nov. 4, 2014

(54) METHOD OF UPDATING CORE DOMAIN INFORMATION FOR ROUTING A SERVICE, COMMUNICATION DEVICE, AND COMMUNICATION ENVIRONMENT

(75) Inventors: Michael F. Coulas, Buffalo Grove, IL (US); Robert Horvath, Arlington Heights, IL (US); Apostolis K. Salkintzis, Athens (GR)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 11/841,103

(22) Filed: Aug. 20, 2007

(65) Prior Publication Data

US 2009/0052460 A1     Feb. 26, 2009

(51) Int. Cl.
| | |
|---|---|
| H04L 12/28 | (2006.01) |
| H04W 48/12 | (2009.01) |
| H04W 48/18 | (2009.01) |
| H04W 40/02 | (2009.01) |
| H04W 36/36 | (2009.01) |
| H04W 80/04 | (2009.01) |

(52) U.S. Cl.
CPC .............. *H04W 48/12* (2013.01); *H04W 48/18* (2013.01); *H04W 40/02* (2013.01); *H04W 36/36* (2013.01); *H04W 80/04* (2013.01)
USPC ............ 370/401; 370/351; 370/389; 370/400

(58) Field of Classification Search
USPC .................................. 370/351, 389, 400, 401
See application file for complete search history.

(56) References Cited

U.S. PATENT DOCUMENTS

2007/0195785 A1* 8/2007 Song et al. ................. 370/395.2
2007/0238467 A1* 10/2007 Buckley et al. ............... 455/445

FOREIGN PATENT DOCUMENTS

| WO | 2006056184 A | 6/2006 |
|---|---|---|
| WO | 2007091803 A | 8/2007 |
| WO | 2007091808 A | 8/2007 |

(Continued)

OTHER PUBLICATIONS

Digital Cellular Telecommunications Systems (Phase 2+); Universal Mobile Telecommunications System (UMTS); Voice Call Continuity (VCC) between Circuit Switched (CS) and IP Multimedia Subsystem (IMS); Jun. 1, 2007, 3GPP TS 23.206, XP014037751, Version 7.3.0 Release 7; Sophia Antipolis Cedex, France.

(Continued)

*Primary Examiner* — Hassan Phillips
*Assistant Examiner* — Gautam Sharma
(74) *Attorney, Agent, or Firm* — Lerner, David, Littenberg, Krumholz & Mentlik, LLP (57) ABSTRACT

A method of updating core domain information for use by a communication device (4) for routing a service for the communication device in a communication environment (2) including a core network (8) having a plurality of core domains (9, 11), and a plurality of radio access networks (6), each of the plurality of radio access networks being associated with at least one of the plurality of core domains, comprises generating (304) by the core network network information. The network information includes information identifying a preferred core domain for the communication device and a preferred radio access network and being based on network based parameters provided by the core network and connectivity information received from the communication device identifying the radio access networks of the plurality of radio access networks which are available to the communication device for communication. The method further comprises receiving (306) at the communication device from the core network the network information and updating (307) the core domain information in the communication device based on the network information. The updated core domain information is used by the communication device for routing a service.

29 Claims, 5 Drawing Sheets

(56) References Cited

FOREIGN PATENT DOCUMENTS

WO     WO 2007091808 A1 *   8/2007
WO     2008067832 A     6/2008

OTHER PUBLICATIONS

PCT Notification of Transmittal of the International Search Report and the Written Opinion of the International Searching Authority, or the Declaration, Oct. 30, 2008, pp. 1-17, PCT/US2008/073533, European Patent Office.

"Digital Cellular Telecommunications System (Phase 2)", Universal Mobile Telecommunications system (UMTS); Voice Call Continuity (VCC) between Circuit Switched (CS) and IP Multimedia Subsystem (IMS); Stage 2, Jun. 1, 2007, 3GPP TS 23.206, Version 7.3.0, Release 7, vol. 3-SA, Sophia Antipolis Cedex, France.

* cited by examiner

METHOD OF UPDATING CORE DOMAIN INFORMATION FOR ROUTING A SERVICE, COMMUNICATION DEVICE, AND COMMUNICATION ENVIRONMENT

FIELD OF THE DISCLOSURE

This disclosure relates to a method of updating core domain information for use by a communication device for routing a service for the communication device in a communication environment, a communication device, and a communication environment.

BACKGROUND OF THE DISCLOSURE

3rd generation (3G) systems, such as the Universal Mobile Telecommunication System (UMTS) have been developed and deployed to further enhance the communication services provided to mobile users compared to those communication services provided by the 2nd generation (2G) communication system known as the Global System for Mobile communication (GSM). In such 3G systems two distinct switch domains or networks have been identified for Radio Access Networks (RANs) which communicate with the mobile devices. These domains are the circuit switched (CS) domain and the packet switched (PS) domain. In the CS domain signals are physically routed to the appropriate destination through a unique connection whereas in the PS domain message packets are routed to the appropriate destination based on addresses in the packet. So for example, a UMTS CS domain is a UMTS RAN (known as UTRAN) communicating via a CS network and a UMTS PS domain is a UTRAN communicating via a PS network. In UMTS, the base stations which are part of the UTRAN are known as Node Bs and a mobile terminal is known as User Equipment (UE).

Other IP-based communication systems, such as wireless LAN (WLAN), Worldwide interoperability for Microwave Access (Wi-MAX), Wi-Fi, Long Term Evolution (LTE) systems, provide communication via a PS domain. It will be appreciated that a GSM system comprising a General Packet Radio System (GPRS) network includes a PS domain through the GPRS network.

With an increase in the number of wireless communication systems deployed and with the development of UEs having multi-mode capability (i.e. CS domain and PS domain), situations arise where a mobile device may be able to communicate via a PS domain or a CS domain or simultaneously via a PS domain and a CS domain. For example, to originate or receive a voice call or to continue a voice call which is already established in a particular coverage area, a mobile device may have the option to use a GSM CS domain or a GSM PS domain or a UMTS PS domain or a Wireless Local Area Network (WLAN) PS domain in that coverage area.

In the case when a voice call is already established, Voice Call Continuity (VCC) requires a voice call to be maintained when the voice call is handed over between different domains or different communication systems and between base stations in the same system. Handling call handovers within the same RAN is relatively easy. Handling call handovers or call establishment between different communication systems with different RANs and between different domains, each of which may involve completely different service providers, is more complicated and this is being addressed and standardised within the third Generation Partnership Project (3GPP).

The current approach defined in the 3GPP standards (3GPP TS 23.206 and TS 24.206) requires a mobile device to select a RAN and domain for call establishment and for call transfer decisions for implementing VCC based on the radio signal strength/quality of the RANs available to the mobile device and on a set of predefined operator VCC rules or policies. These operator policies are typically configured into the mobile device during initial provisioning and may be changed at a later time, for example, by over the air (OTA) provisioning, as the network VCC capabilities evolve.

As stated above, the VCC mobility approach currently defined in the 3GPP standards by which an appropriate RAN and domain are selected requires the mobile device to be the decision maker and to determine the events which trigger a decision. Other than the received signal strengths that are monitored by the mobile device and the predefined operator VCC rules or policies, the mobile device has no visibility into the overall network characteristics and thus, does not make selection decisions based on network resource related parameters, such as load-balancing, available bandwidth or Quality of Service (QoS) thresholds for triggering a decision. Thus, the current approach does not allow for a selection mechanism which is flexible enough to be controlled in real-time so as to take account of real-time network resource issues. For example, in a situation when a particular RAN and domain are specified in the predefined operator VCC rules and are available to the mobile device (as determined from monitoring the signal strengths from the RAN) but the domain is overloaded, a call will not be established or if a call is already established, the call will be terminated even though another domain and RAN may be available to the mobile device.

U.S. Pat. No. 6,567,667 discloses a domain selecting system which enables the network to tell the mobile device which services (e.g. services such as voice calls) are supported and/or preferred over which domains. The mobile device can then use this information to influence its decision as to which domain to use when initiating a particular service. For example, the network sends domain preference information for the services to the mobile device when the mobile device connects to a particular RAN. This patent is aimed at supporting migration of services from one domain to another and thus, although discloses sending network specified information such as mapping of certain services and applications to certain domains, or routing certain percentages of calls to one domain or routing calls to a domain that offers the lowest cost, this patent does not disclose the domain selection decisions being based on real-time network resource information. Nor does it address changing domains during an established call. Thus, the result for the specific situation described above would be the same for the system disclosed in this patent.

PCT patent application no. WO 2007/079582 describes a system for selecting a domain in a network for directing an incoming call to the mobile device. Domain selection policies or rules are stored in a network server and may be modified by the mobile device. User preferences are uploaded to the network with operator policies normally overriding user preferences. The domain selection policies are used by the network to select a domain for directing an incoming call to the mobile device.

There is therefore a need for an improved process for updating domain selection information which is flexible and takes account of information provided by the mobile device and network resource information.

BRIEF DESCRIPTION OF THE DRAWINGS

A method of updating core domain information for use by a communication device for routing a service for the communication device in a communication environment, a communication device, and a communication environment, in accordance with the disclosure will now be described, by way of example only, with reference to the accompanying drawings in which.

DETAILED DESCRIPTION OF THE DRAWINGS

The term service as used herein is intended to cover services for the end user of the communication device and includes voice calls, video, audio or other multimedia sessions, file delivery services, bulletin board and broadcast notification services like news feed, web-surfing network gaming, database access, email, SMS or similar services which provide the capability for information transfer. The disclosure will however be described in relation to voice calls for illustrative purposes.

Figure 1:
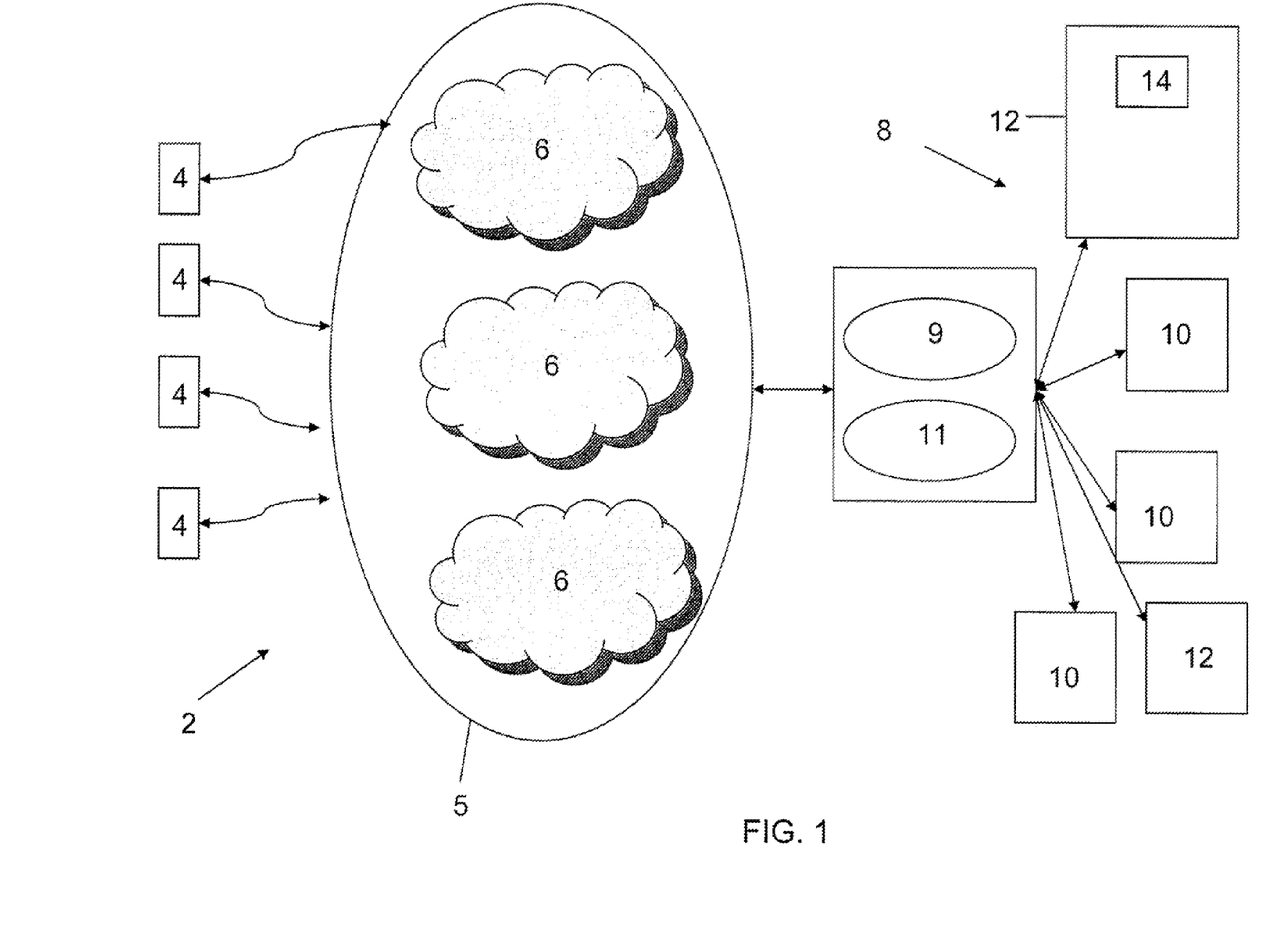
FIG. 1 is a block schematic diagram of a communication environment.

Referring firstly to FIG. 1, a communication environment 2 comprises a plurality of communication devices (User Equipment (UE) devices) 4 capable of communicating with an access environment 5 including a plurality of radio access networks RANs 6. Examples of RANs which may be part of the access environment 5 include GSM access network (including GSM/EDGE RAN (GERAN)), UMTS access network, CDMA 1X, CDMA EV-DO, HSPA (HSDPA/HSUPA) access networks, WLAN access network, Wi-Max access network, Evolved-UTRAN (E-UTRAN). Note, the term RAN is also intended to cover the radio elements that couple a UE to networks such as a PSTN or a cable operators HFC/IP network which would be part of the access environment 5. The radio elements, e.g. a base station or Wi-Fi Access Point, communicate with the UE over radio communication links but may themselves be coupled via a wired connection to the access network. Each of the RANs 6 in the access environment 5 may include CS elements and PS elements.

A core network 8, which in an embodiment, is an IP Multimedia Subsystem (IMS) as defined in the 3GPP standards, is coupled to the access environment 5 and for managing applications and the radio access domains in order to provide services to or from the UE 4. As is well known, the IMS core network is designed to allow service providers to manage a variety of services that can be delivered via IP over any network type, including CS networks, wherein IP is used to transport both traffic information and Session Initiation Protocol (SIP) based signalling information.

The IMS 8 is divided into a plurality of core domains including a CS domain and a PS domain with some of the IMS elements, such as Mobile services Switching Centre (MSC), and Gateway MSC being CS elements, some of the IMS elements, such as Serving GPRS Support Node (SGSN) and Gateway GPRS Support Node (GGSN) being PS elements and some of the IMS elements such as Visitor Location Register (VLR) and Home Location Register (HLR) being shared by both domains. The structure of the IMS 8 is well known in the art. The core domains are represented by elements 9 and 11 in FIG. 1. Each of the RANs 6 are associated with at least one of the core domains 9 and 11.

The IMS core network 8 further includes, amongst other things, application servers 12 to support various IMS services such as Push-To-Talk (PTT), Rich Voice Call (RVC) and VCC and various SIP servers 10 for the routing of SIP signalling messages between end users (e.g. UEs) and the application servers 12.

An application server 12 in the IMS 8 is arranged to implement the VCC function represented by element 14 in FIG. 1. VCC policy information for a UE indicates the rules the UE should take into account when deciding which domain to use when establishing a voice call or before considering initiating a domain transfer when performing a handover of a voice call for VCC, respectively. VCC policy information for a specific user are provisioned in the IMS 8 by the network operator and stored on a Device Management Server (DMS) (not shown) in the IMS 8. The VCC policy information is communicated to the UE during initial provisioning of the UE or The DMS is arranged to use an over-the-air device management protocol (e.g. OMA DM) to download the policy information to the UE 4. Any updates to the VCC policy information made by the operator are communicated to the UE via OMA DM. The VCC function element 14 in the application server 12 obtains access to the VCC policy information stored in the DMS in order to help it make domain selection decisions when implementing the VCC function. The VCC policy information of a user may be updated by the IMS 8 and/or a user via a UE 4.

The 3GPP standard in technical specification TS 23.206 currently defines the VCC policy information as including the following type of information:

Preferred domain—If a domain is preferred for originating calls/sessions (for example, GSM CS domain, GSM PS domain, UMTS PS domain etc).

Immediate Domain Transfer (DT) allowed. True or false?—Whether domain transfer is to be initiated immediately to the preferred domain when that domain becomes available.

DT CS-to-PS direction allowed. True or false?

DT PS-to-CS direction allowed. True or false?—Whether domain transfer is restricted to a single direction (i.e. PS to CS or CS to PS).

In addition, the policy information may indicate whether domain transfer is restricted when the UE is engaged in an active and a held/waiting call/session on the transferring-out domain (the restriction does not apply in the case when the UE is going to lose coverage in the transferring-out domain).

Figure 2:
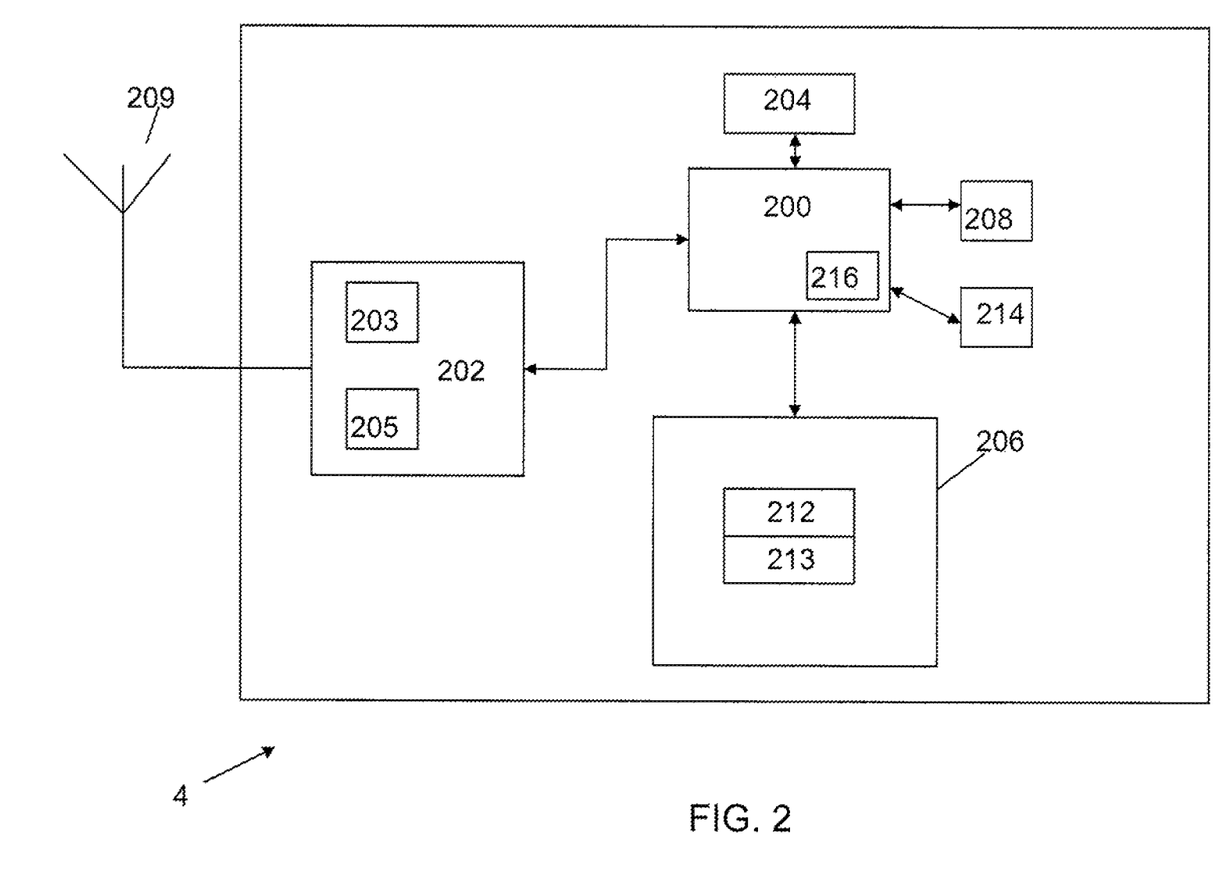
FIG. 2 is a block schematic diagram of a UE in accordance with an embodiment of the present disclosure for use in the communication environment of FIG. 1.

Referring now also to FIG. 2 which is a partial schematic block diagram of an exemplary communication device operable as a UE 4 having multi-mode capability (e.g. CS domain and PS domain capability). As will be apparent to a skilled person, only those functional components of the UE that are necessary for an understanding of the disclosure have been shown and will be described. The UE 4 may be a portable or handheld or mobile telephone, a Personal Digital Assistant (PDA), a portable computer, portable television and/or similar mobile or other communication devices.

The UE 4 comprises a processing unit 200 for configuration and control of the UE 4. The processing unit 200 is communicably coupled to a RF communication unit 202 which typically comprises a receiver (203), transmitter (205), a modulation/demodulation section (not shown), a coding/decoding section (not shown) as is well known in the art, and to a Man Machine Interface (MMI) 204. The MMI 204 includes elements such as a key pad, microphone, speaker, a display, for providing an interface between the UE 4 and the user of the UE 4. If the UE 4 incorporates a removable Subscriber Identity Module (SIM) to control access and provide storage of data, then a SIM interface 208 is further coupled to the processing unit 200. The RF communication unit 202 is coupled to an antenna 209.

The processing unit 200 may be a single processor or may comprise two or more processors carrying out all processing required for the operation of the UE 4. The number of processors and the allocation of processing functions to the processor is a matter of design choice for a skilled person. The UE 4 also has a program memory 206 in which is stored programs containing processor instructions for operation of the UE 4. The programs may contain a number of different program elements or sub-routines containing processor instructions for a variety of different tasks, for example, for: communicating with the user via the MMI 204; and processing signalling messages received from the radio access networks 6. Specific program elements stored in program memory 206 include an domain selection program element 212 for selecting a new core domain and a Radio Access Technology (RAT) measurement program element 213.

The UE 4 under the control of the RAT measurement program element 213 is arranged to take measurements with respect to one or more RANs at regular intervals, for example by measuring the signal strengths and/or quality of any signals received by the UE 4 from RANs. For instance, the GSM system requires mobile devices to take measurements with respect to neighbouring cell base station transmitters. In GSM, this is known as a neighbouring cell measurement (MX) period. Such measurement periods facilitate handover between cells of a single RAN and between different RANs and different core domains. From the measurements, the UE 4 can then determined which RANs are available for communication. For example, only those RANs with signals measured to be of sufficient strength to support a voice call would be able to route services successfully to and from the UE 4. The UE 4 can also determine whether the RAN supports either domain: for example, whether a GSM RAN supports PS access or not. If the GSM signal strength is strong enough and the GSM RAN supports both CS and PS access, then both domains would be available. Note, there may be other factors such as maximum bandwidth (bit rate) that determine whether a PS GSM RAN would be an appropriate candidate for an available PS domain. For example, a 2.5G GPRS access network would have insufficient bandwidth to support VoIP but a EDGE GPRS (EGPRS) or UMTS access network would.

The UE 4 further comprises a memory 214 for storing predefined VCC policy information. As indicated in the introduction, predefined VCC policy information is determined by the network operator and is typically configured into the memory 214 of the UE 4 during initial set-up of the UE. The predefined VCC policy information in the UE may be changed at a later time by the IMS 8, for example, by OTA provisioning. The memory 214 is shown in FIG. 2 as being separate to the processing unit 200 but may be part of the processing unit 200 or the SIM (not shown). The VCC policy information stored in memory 214 generally corresponds to the VCC policy information stored for the UE 4 in the DMS (not shown) in the IMS 8.

The processing unit 200 further comprises a working memory 216 for storing core domain information or current VCC policy information (hereinafter referred to as working core domain information or working VCC policy information) which working VCC policy information is used by the communication device for routing a service. The working memory 216 may be a buffer, a register, some sort of volatile memory and although shown as part of processing unit 200 may be separate to the processing unit 200. In an embodiment, the working VCC policy information held in the working memory 216 is in the same format and includes the same types of information as the predefined VCC policy information stored in memory 214. At power up of the UE 4, the working VCC policy information is initialized to the predefined VCC policy information stored in memory 214. The working VCC policy information may be updated at any time and the way it is updated will be described in more detail below.

The processing unit 200 under the control of the domain selection program element 212 controls the UE 4 to perform domain transfers or to select a core domain according to the working VCC policy information held in the working memory 216.

The VCC function element 14 may also communicate the working VCC policy information to other functions in the application server 12 as required.

A method of updating core domain information (working core domain information) for routing a service, such as a voice call, for a UE 4 in accordance with an embodiment of the disclosure will now be described with reference to the flow chart shown in FIG. 3. A decision to select one of the core domains based on the updated core domain information may occur during idle mode (when the UE is idle and not in a call or other service) or during a call in progress to trigger a handover and ensure VCC.

At step 302, information including connectivity information identifying the RANs of the plurality of RANs 6 which are available to the UE 4 for communication are transmitted to the IMS 8. In an embodiment, this step is event triggered and events which trigger the step 302 include a change in the RANs which are available to the UE 4 for communication, with a change including for example a new RAN being identified as being available or an existing RAN being identified as becoming unavailable. As discussed above, the available RANs are identified by the periodic measurements performed by the UE 4 to determine those RANs that can support voice calls or other services. The connectivity information sent by the UE 4 to the IMS 8 may simply indicate whether a CS RAN is available or not or whether a PS RAN is available or not. This is sufficient to support basic VCC operation. However, in an embodiment, connectivity information identifying all the CS RANs and PS RANs that are available to the UE 4 is transmitted to the IMS 8.

Figure 4:
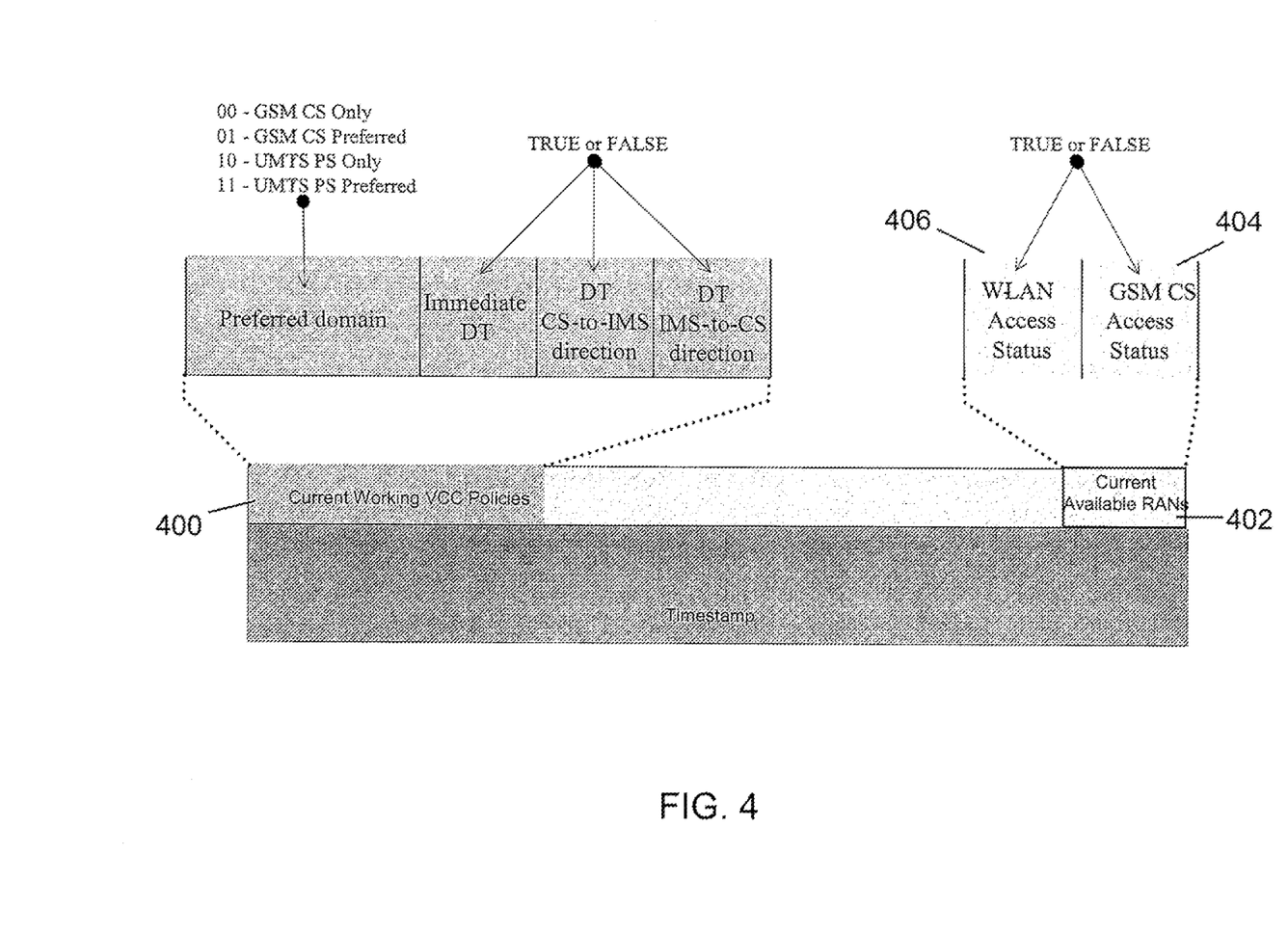
FIG. 4 is a simplified representation of exemplary information sent from the UE to the core network in accordance with the disclosure.

The connectivity information is transmitted to the IMS 8 and the VCC function element 14 via one of the available RANs 6 to which the UE 4 is currently registered. In an embodiment, the information transmitted by the UE 4 to the IMS 8 further includes the current working VCC policy information which is being held in the working memory 216 and which is currently determining the domain transfers of the UE 4 is also transmitted along with the available RAN information. An example representation of the information that may be transmitted to the IMS 8 is shown in FIG. 4. Field 400 represents the current working VCC policy information and field 402 represents the information concerning the available RANs. In the example shown, the UE 4 is a dual-mode device supporting VCC and can only support two communication systems for voice calls: GSM CS represented by field 404 and WLAN represented by field 406.

At step 304, the VCC function element 14 uses the connectivity information received from the UE 4, including the identified available RANs, and network based parameters to generate network information including information identifying a preferred core domain of the plurality of core domains 9 and 11 for the UE 4. In other words, the VCC function element 14 uses the information received from the UE 4 as to the RANs available to the UE 4 and the network based parameters to determine whether it is appropriate to change the current preferred core domain as indicated in the current working VCC policy information to a new preferred core domain and generates the network information as a result. The network information may also identify a new preferred RAN of the available RANs 6 based on the information received from the UE 4 and the network based parameters in addition to the new preferred core domain.

The network based parameters may include one or more of the following: load information of the RANs and/or core domains 9 and 11, available bandwidth, QoS thresholds for triggering a domain transfer, operator policies or rules, user preference information, and other parameters known only to the core network, including parameters which relate to network resource availability, such as information about network maintenance which results in reduced availability in some RANs or core domains. These network based parameters may be provisioned in the core network by the operator, determined by the core network, or in the case of user preferences, provided to the core network by the user.

Figure 5:
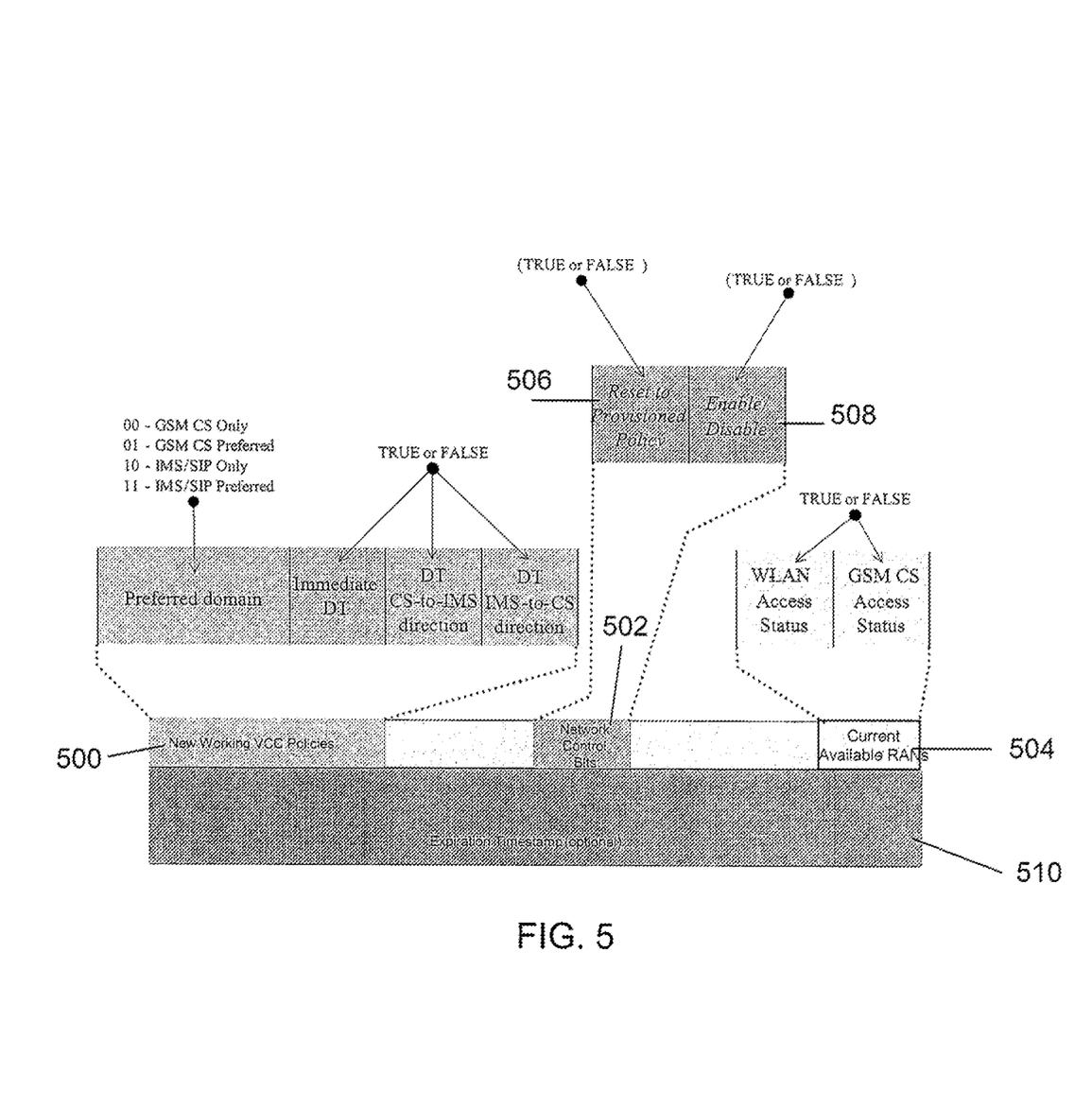
FIG. 5 is a simplified representation of exemplary information sent from the core network to the UE in accordance with the disclosure.

In an embodiment, the network information may include fields for the same type of information as the VCC policy information for the UE 4 e.g. information on the preferred domain, Immediate DT, etc . . . Thus, in an embodiment the network information may include new working VCC policy information. The network information is then sent by the IMS 8 (the VCC function element 14) to the UE 4. An example representation of the information that may be transmitted to the UE 4 is shown in FIG. 5. Field 500 represents the new working VCC policy information which has been generated by the IMS 8 based on the network based parameters and RAN available information provided by the UE 4. Field 504 includes information concerning the current available RANs. The current available RANs information in this field 504 corresponds to the latest information provided, for example, in field 402 in the information received from the UE 4 (see FIG. 4) and is used for synchronization purposes. In other words, the IMS 8 informs the UE 4 that the new working VCC policy information in field 500 is based on the list of available RANs in field 504 which it believes to be the current list (i.e. the last list of available RANs received from the UE). If this list is no longer correct, then the UE 4 will upload a new list of available RANs in a message, such as that shown in FIG. 4, which may cause the IMS 8 to send new working VCC policy information to the UE 4. FIG. 5 (as does FIG. 4) only shows two available RANs: WLAN and GSM CS. This is for illustrative purposes only. It will be appreciated that more than two RANs may be available to the UE 4 in which case more than two boxes (404, 406) will be transmitted to the IMS 8 and more than two boxes will be transmitted to the UE 4 from the IMS 8. When there are more than one available PS RANs and listed in the available RAN list, the IMS 8 needs to identify to the UE 4 which of the available PS RANs is the preferred one (assuming PS core domain is preferred). This enables the IMS 8 and UE to support and control PS to PS domain VCC (e.g. inter RAN) as well as VCC between CS and PS domains. The preferred PS RAN would be identified in the information sent to the UE 4 by the IMS 8. This information is not shown in FIG. 5.

In an embodiment, the network information sent to the UE 4 further includes field 502 including control bits. Reset bit(s) 506 is used by the IMS 8 to indicate to the UE 4 that the UE 4 should reset the working VCC policy information in working memory 216 to the predefined VCC policy information. Enable/disable bit(s) 508 is used by the IMS 8 to enable or disable the feature of updating the working VCC policy information. When the feature is disabled, the UE 4 does not transmit the information indicating available RANs to the IMS 8 and the IMS 8 does not generate new working VCC policy information and the control of domain selection and VCC procedures revert to the known methods which are based on the predefined VCC policy information. This allows the core network to control usage of this feature of updating the working VCC policy information to when it is really needed, such as during peak calling hours or when maintenance is being performed on the network infrastructure. This feature of updating the working VCC policy information is automatically enabled in the UE 4 at power up: that is, at power up, the UE 4 uploads its list of candidate available RANs to the IMS 8 and the IMS 8 may then decide whether to continue operating the feature or to disable it by means of the enable/disable bit(s).

In an embodiment, the UE 4 uses a V3 interface (defined in the 3GPP Technical Specification TS 23.206) to communicate with the VCC function element 14 in the VCC application server 12. The VCC function element 14 uses the V3 interface to communicate with the UE 4. The V3 interface may be implemented over either CS (e.g. using USSD) or PS transport (e.g. using Ut interface (HTTP)). So the V3 interface is available for communication between the UE 4 and the VCC function element 14 when the UE 4 is using any of the core domains 9 and 11. However, it will be appreciated that any bi-directional information between the UE 4 and the IMS 8 may be used.

At step 306, the network information, including in an embodiment the new working VCC policy information, is received at the UE 4 from the IMS 8. The new working VCC policy information received from the IMS 8 is written to the working memory 216 so as to update the working VCC policy information held in the working memory 216 to the new working VCC policy information (step 307). The new working VCC policy information takes effect immediately so that future domain selection decisions are based on the new working VCC policy information in the working memory 216.

At step 308, the UE 4 selects the preferred core domain for routing the service based on the network information. This may involve a domain transfer from an existing core domain to the preferred core domain indicated in the new working VCC policy information if the preferred core domain has changed. The UE 4 may also select a new preferred RAN of the available RANs 6 based on the network information.

If the UE 4 is in idle mode (e.g. not in a call) and the preferred core domain has not changed, then the UE 4 just updates the working VCC policies. If the UE 4 is in idle mode (e.g. not in a call) and the preferred core domain has changed, then the UE 4, in addition to updating the working VCC policies, selects which core domain it wants to use to originate/receive calls based on the working VCC policy information and RAN availability and performs what's called an idle mode domain transfer. This involves registering in the new preferred core domain (if not already done so) and typically deregistering from the old preferred core domain. The UE 4 needs to be registered in a core domain (PS or CS) in order to use it (i.e., originate and receive calls in that domain). Normally a dual-mode UE 4 will only be registered in a single core domain unless it is preparing to handover a call, in which case it needs to be temporarily registered in both core domains (i.e., the old and the new core domains). A reason for only being registered in one core domain at a time (i.e., the preferred domain) is, for example, to conserve battery life.

While in a call, the UE 4 may also select a different core domain (based on the working VCC policy information and the available RANs) but that causes a domain transfer of the call (handover). In this case, the UE 4 registers in the new preferred core domain, transfers the call to the new preferred core domain, and optionally, deregisters from the old core domain. The UE 4 may want to remain dual registered while in a call in order to facilitate back and forth handoffs. Once a call is ended, the UE 4 deregisters from the old core domain.

In an embodiment, the processing unit 200 under the control of the domain selection program element 212 controls the UE 4 to perform domain selection according to the new working VCC policy information held in the working memory 216. If the Immediate DT field of the new working VCC policy information is set 'true', then once the new working VCC policy information is stored in the working memory 216, a domain selection and transfer is triggered during an existing or established call (for VCC), by which a domain transfer from an existing core domain to the preferred core domain is performed. The Immediate DT field only impacts domain transfer of a call. It does not apply to idle mode transfers which should occur immediately.

In an embodiment, additional information may be included in the network information which sets a time period for which the network information sent by the IMS 8 is valid. In the example shown in FIG. 5, a time stamp 510 is provided in the network information sent to the UE 4. The time stamp 510 may indicate an expiration time associated with the new working VCC policy information in field 500 which limits the time that the new working VCC policy information is to be in effect. Upon expiration of the time specified in the time stamp 510, the processing unit 200 resets the working VCC policy information in working memory 216 to the predefined VCC policy information.

As discussed above, the UE 4 uploads information identifying the available RANs to the IMS 8 in response to an event and the IMS 8 provides network information to the UE 4 based on the connectivity information received from the UE 4 and on network based parameters. However, the IMS 8 may send network information, including a new working VCC policy information, to the UE 4 at any time in which case the method of selecting a core domain starts at step 304. For example, the IMS 8 may wish to initiate a domain transfer irrespective of whether there has been a change in available RANs, for example when the QoS provided by a core domain is determined by the IMS 8 to reach a predetermined threshold. In this case, the currently available connectivity information (previously received from the UE 4) on the available RANs is used by the IMS 8 to generate the new working VCC policy information. The new working VCC policy information may take effect immediately and may trigger idle mode or VCC domain transfers in the UE 4.

As a further illustration of the above described embodiment of the disclosure, a couple of example scenarios are described below.

EXAMPLE 1

Scenario: The preferred domain as specified in the VCC policy information is to be changed while a UE is in a voice call so as to initiate an immediate domain transfer of the voice call.

Initial conditions: The UE is in both GSM CS and Wi-Fi coverage and has an ongoing PS Voice over IP (VoIP) call via the IMS 8.

Old working VCC policy information held in working memory 216:
 Preferred domain: IMS preferred
 Immediate DT: True
 DT CS-to-PS direction: Not restricted
 DT PS-to-CS direction: Not restricted New working VCC policy information sent to UE 4 by IMS 8 and stored in working memory 216:
 Preferred domain: GSM CS preferred
 Immediate DT: True
 DT CS-to-PS direction: Restricted
 DT PS-to-CS direction: Not restricted
 Outcome: The UE 4 performs an immediate domain selection and transfer of its IMS VoIP call to a GSM CS call because the preferred domain field has been changed to GSM CS and the Immediate DT field is set to true. Also, since the DT CS-to-PS direction field has been changed to restricted, the UE cannot transfer the call back to IMS 8.

EXAMPLE 2

Scenario: The IMS 8 desires to disable IMS VoIP for a period of time in order to do maintenance.

Initial conditions: The UE is in both GSM CS and Wi-Fi coverage and is in IMS idle mode (i.e. there is no ongoing voice call).

Old working VCC policy information held in working memory 216:
 Preferred domain: IMS preferred
 Immediate DT: True
 DT CS-to-PS direction: Not restricted
 DT PS-to-CS direction: Not restricted New working VCC policy information (time stamped in time stamp field 510 to expire in 3 hours) sent to UE 4 by IMS 8 and stored in working memory 216:
 Preferred domain: GSM CS only
 Immediate DT: True
 DT CS-to-PS direction: Not restricted
 DT PS-to-CS direction: Not restricted
 Outcome: The UE 4 performs an idle mode domain selection and transfer to GSM CS domain because the preferred domain field has been changed to GSM CS only. Consequently, from now on and for the next 3 hours, all new voice calls will be GSM CS voice calls. The new working VCC policy information held in the working memory 216 will expire in 3 hours after which time the working VCC policy information will be reset to the predefined VCC policy information held in the memory 214.

In a second embodiment of the disclosure, instead of downloading new working VCC policy information to the UE 4 as in the first embodiment described above, the core network is arranged to tell the UE 4 exactly which core domain to use. Thus, in the second embodiment, the core network has more direct control over which core domain the UE can use compared to the first embodiment.

In order to support this, a new working parameter called "Current Domain/RAN" is defined and is maintained by the UE 4. The Current Domain/RAN parameter identifies the core domain and RAN currently used by the UE 4 for routing a service, such as originating/receiving calls and calls in progress.

As in the first embodiment, the UE 4 transmits to the IMS 8 information including connectivity information identifying the RANs of the plurality of RANs 6 which are available to the UE 4 for communication. The IMS 8 uses the connectivity information received from the UE 4, including the identified available RANS, and factors, for example, the network resource parameters identified above with respect to the first embodiment, to generate a new value of the parameter "Current Domain/RAN". However, instead of downloading new working VCC policy information to the UE 4, the core network/IMS 8 downloads the new value of the parameter "Current Domain/RAN" to the UE 4 and the new value of the parameter is used to update the current "Current Domain/RAN" parameter held in the UE 4.

Thus, the parameter "Current Domain/RAN" can be dynamically updated at any time by the IMS 8, based on the connectivity information sent to it by the UE and the network resource parameters. The updated "Current Domain/RAN" parameter takes effect immediately.

If the UE 4 has call(s) in a different core domain and/or RAN, then the UE 4 must domain transfer the call(s) to the new core domain and/or RAN specified in the updated "Current Domain/RAN".

If the UE 4 is in idle mode in a different core domain and/or RAN, then the UE 4 does an idle mode domain transfer to the new core domain and/or RAN specified in the updated "Current Domain/RAN".

The UE 4 remains in the core domain and RAN according to the "Current Domain/RAN" parameter until it is changed by the core network or the feature is disabled by the core network.

If connectivity to the new core domain specified in the updated "Current Domain/RAN" parameter is not possible, then the UE 4 may remain in it's current core domain and RAN until connectivity to the updated "Current Domain/RAN" is achieved at which time a domain transfer is executed.

At power up, the UE 4 determines the "Current Domain/RAN" parameter from the current RAN connectivity status and the predefined VCC policy information held in the memory 214 of the UE 4.

As with the first embodiment, the core network 8 may, at any time, disable and, at a later time, re-enable this feature of updating the "Current Domain/RAN" parameter in the UE 4. When this feature is disabled, the UE 4 reverts to using the predefined VCC policy information and current RAN connectivity status to determine its "Current Domain/RAN" parameter which is used by the UE for routing a service.

As a further illustration of the second embodiment of the disclosure, a couple of example scenarios are described below.

EXAMPLE 1

Scenario: Force immediate domain transfer of an established call

Initial Conditions: UE is in GSM CS coverage and has an ongoing GMS CS call. UE then enters WiFi coverage and when the WiFi signal becomes strong enough, the UE sends a new list of candidate access networks to the IMS 8. However, the UE does not domain transfer to IMS upon entering WiFi coverage because the "Current Domain/RAN" parameter is currently set to GSM CS and direct network control is enabled.

Action: IMS 8 sets "Current Domain/RAN" parameter to WLAN and sends new value to the UE.

Final Outcome: Upon receiving the new value for "Current Domain/RAN" parameter from the IMS 8, the UE performs an immediate domain transfer of its GSM CS call to an IMS VoIP call over WiFi in PS domain. Subsequent calls will be originated/terminated via IMS until further notice from network.

EXAMPLE 2

Scenario: Disable IMS VoIP for a period of time in order to do maintenance.

Initial Conditions: UE is in both GSM CS and WiFi coverage and direct network control of VCC is disabled. Consequently, the UE is using its predefined VCC policy information which indicates that the preferred domain is "IMS Preferred". The UE currently has no active calls.

Action: The IMS 8 activates direct network control of VCC and sets the "Current Domain/RAN" parameter to GSM CS and sends new value to UE.

Final Outcome: Upon receiving the new value for "Current Domain/RAN" from the network, the UE performs an immediate idle mode domain transfer to GSM CS domain. Subsequent calls will be originated/terminated via GSM CS until further notice from network.

Figure 3:
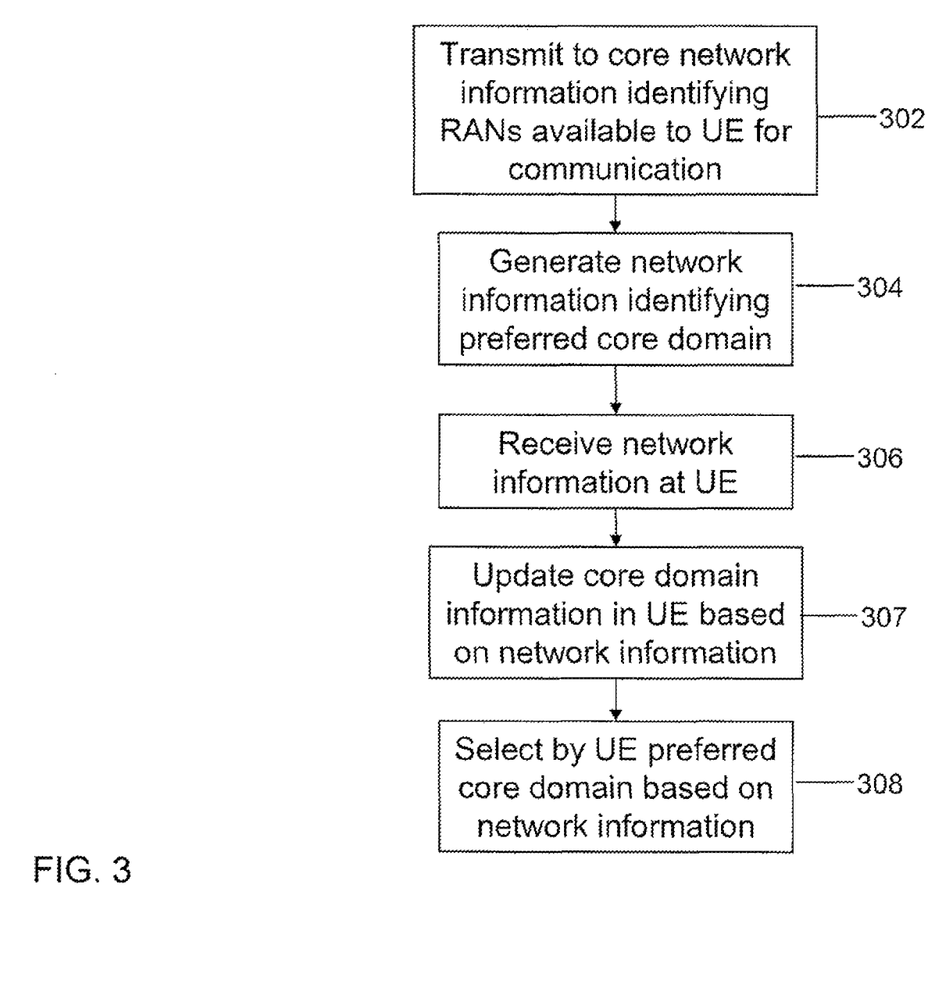
FIG. 3 is a simplified flow diagram showing a method of updating core domain information for routing a service for a UE in accordance with an embodiment of the disclosure.

The implementation of the second embodiment is very similar to that described above with respect to the first embodiment (e.g. FIGS. 1-3 and the accompanying description apply accordingly to the second embodiment).

Thus, the method in accordance with the disclosure allows for the core domain information (including for example VCC policy information or a "Current Domain/RAN" parameter) used by the UE for routing a service to be updated in real-time by the core network supporting VCC service so that the core network can dynamically change the working core domain information (VCC policy information or a "Current Domain/RAN" parameter) for a specific user based on network based parameters and the RANs which are available for communication. This enables the core network to change the preferred domain for originating and receiving calls and change the supported handover direction and if the conditions are right, trigger a domain transfer of an established call. Furthermore, the core network can, at any time, dynamically reset the working core domain information (VCC policy information or a "Current Domain/RAN" parameter) used by the UE based on the predefined VCC policy information. Thus, the disclosure enables the UE to have visibility into the network characteristics so that the UE can make call handover decisions and call establishment decisions (UE originated or UE terminated) based on network based parameters.

The present invention has been described above with respect to selecting a core domain for routing voice calls for call establishment and for handovers for VCC. It will be appreciated that the disclosure is not intended to be limited to voice call services and may apply to any services which may require core domain transfers.

The invention claimed is:

1. A method of initiating a transfer of a communication service used by a communication device for an active call to a new core domain or radio access network in a communication environment including a core network having a plurality of core domains, and a plurality of radio access networks, each of the plurality of radio access networks being associated with at least one of the plurality of core domains, the method comprising:

receiving at the core network from the communication device availability information identifying the radio access networks of the plurality of radio access networks which are currently available to the communication device;

generating, by the core network, in response to receiving the network availability information from the communication device, network information including information identifying a preferred core domain and a preferred radio access network for the communication device and being based on network based parameters provided by the core network and availability information received from the communication device;

identifying, by the core network, if an ongoing communication service needs to be transferred to another core domain or radio access network; and transmitting to the communication device from the core network the network information when the network determines that an ongoing communication service needs to be transferred to another core domain or radio access network, the network information to update the existing network information in the communication device and initiate a transfer of a communication service for the active call to a new core domain or radio access network based on currently transmitted network information.

2. The method according to claim 1, further comprising:
transmitting by the communication device to the core network information including availability information identifying the radio access networks of the plurality of radio access networks which are available to the communication device for communication.

3. The method according to claim 2, wherein the information further includes current core domain information being used currently by the communication device for routing a service.

4. The method according to claim 2, wherein the availability information is transmitted by the communication device in response to an event including a change in the radio access networks of the plurality of radio access networks which are available to the communication device for communication.

5. The method according to claim 1, further comprising selecting by the communication device the preferred core domain identified in the updated core domain information for routing a service.

6. The method according to claim 1, further comprising selecting by the communication device the preferred core domain identified in the updated core domain information for routing a service and initiating by the communication device a domain transfer from an existing core domain to the preferred core domain.

7. The method according to claim 6, wherein selecting includes registering with the preferred core domain.

8. The method according to claim 6, wherein the domain transfer is performed during one of an idle mode or during an established service.

9. The method according to claim 1, wherein the communication device includes a memory for storing predefined core domain information and wherein the core domain information used by the communication device is based on the predefined core domain information.

10. The method according to claim 1, wherein the communication device includes a memory for storing predefined core domain information and wherein the network information further includes reset information, and the method further comprises resetting the core domain information used by the communication device to be based on the predefined core domain information when the reset information has a predetermined value.

11. The method according to claim 1, wherein the communication device includes a memory for storing predefined core domain information and wherein the network information further includes enable/disable information, and the method further comprises enabling the method of updating the core domain information used by the communication device when the enable/disable information has a first value and disabling the method of updating the core domain information and arranging for the core domain information used by the communication device to be based on the predetermined core domain information when the enable/disable information has a second value.

12. The method according to claim 1, wherein the network information further includes the availability information.

13. The method according to claim 1, wherein the communication device includes a memory for storing predefined core domain information and wherein the network information further includes time stamp information for setting a time period for which the network information is valid, the method further comprising updating the core domain information used by the communication device to be based on the predetermined core domain information on expiry of the time period.

14. The method according to claim 1, wherein the core domain information used by the communication device includes a working parameter for identifying the core domain currently used by the communication device for routing a service, and the network information includes a new working parameter based on the network based parameters and the availability information from the communication device, and the method comprises updating the working parameter in the communication device based on the new working parameter received from the core network and initiating a domain transfer when the new working parameter is different from the working parameter in the communication device.

15. The method according to claim 1, wherein the core domain information used by the communication device includes working VCC policy information, and the network information includes new working VCC policy information based on the network based parameters and the availability information from the communication device, and the method comprises updating the working VCC policy information in the communication device based on the new working VCC policy information received from the core network.

16. The method according to claim 1 further comprising generating and transmitting by the core network the network information to the communication device at any time.

17. A communication device operable to communicate using a service in a communication environment including a core network having a plurality of core domains, and a plurality of radio access networks, each of the plurality of radio access networks being associated with at least one of the plurality of core domains, the communication device comprising:
a transmitter for transmitting to the core network information including availability information identifying the radio access networks of the plurality of radio access networks which are available to the communication device for communication;
a receiver for receiving, in response to the communication device transmitting the availability information, network information from the core network, the network information including information identifying a preferred core domain for the communication device and being based on network based parameters provided by the core network and the availability information received from the communication device, the communication device receiving network information from the core network only when the core network has determined that an ongoing communication service needs to be transferred to another core domain or radio access network; and
a processing unit coupled to the receiver and the transmitter, the processing unit being arranged in operation to update the existing network information in the communication device and initiate transfer of a communication service for an active call based on the network information currently received in response to the communication device transmission of the availability information.

18. The communication device according to claim 17, wherein the information transmitted by the communication device further includes current core domain information being used currently by the communication device for routing a service.

19. The communication device according to claim 17, wherein the availability information is transmitted by the communication device in response to an event including a change in the radio access networks of the plurality of radio access networks which are available to the communication device for communication.

20. The communication device according to claim 17, wherein the processing unit is further arranged to select the preferred core domain identified in the updated core domain information for routing a service.

21. The communication device according to claim 17, wherein the processing unit is further arranged to select the preferred core domain identified in the updated core domain information for routing a service and to initiate a domain transfer from an existing core domain to the preferred core domain.

22. The communication device according to claim 21, wherein the domain transfer is performed during one of an idle mode or during an established service.

23. The communication device according to claim 17, wherein the communication device includes a memory for storing predefined core domain information and wherein the core domain information used by the communication device is based on the predefined core domain information.

24. The communication device according to claim 17, wherein the communication device includes a memory for storing predefined core domain information and wherein the network information further includes reset information, and the processing unit is further arranged to reset the core domain information used by the communication device to be based on the predefined core domain information when the reset information has a predetermined value.

25. The communication device according to claim 17, wherein the communication device includes a memory for storing predefined core domain information and wherein the network information further includes enable/disable information, and the processing unit is further arranged to enable the updating of the core domain information used by the communication device when the enable/disable information has a first value and to disable the updating of the core domain information and arranging for the core domain information used by the communication device to be based on the predetermined core domain information when the enable/disable information has a second value.

26. The communication device according to claim 17, wherein the network information further includes the availability information.

27. The communication device according to claim 17, wherein the communication device includes a memory for storing predefined core domain information and wherein the network information further includes time stamp information for setting a time period for which the network information is valid, the processing unit being further arranged to update the core domain information used by the communication device to be based on the predetermined core domain information on expiry of the time period.

28. The communication device according to claim 17, wherein the core domain information used by the communication device includes a working parameter for identifying the core domain currently used by the communication device for routing a service, and the network information includes a new working parameter based on the network based parameters and the availability information from the communication device, and the processing unit is further arranged to update the working parameter in the communication device based on the new working parameter received from the core network and to initiate a domain transfer when the new working parameter is different from the working parameter in the communication device.

29. The communication device according to claim 17, wherein the core domain information used by the communication device includes working VCC policy information, and the network information includes new working VCC policy information based on the network based parameters and the availability information from the communication device, and the processing unit is further arranged to update the working VCC policy information in the communication device based on the new working VCC policy information received from the core network.

* * * * *